UNITED STATES PATENT OFFICE.

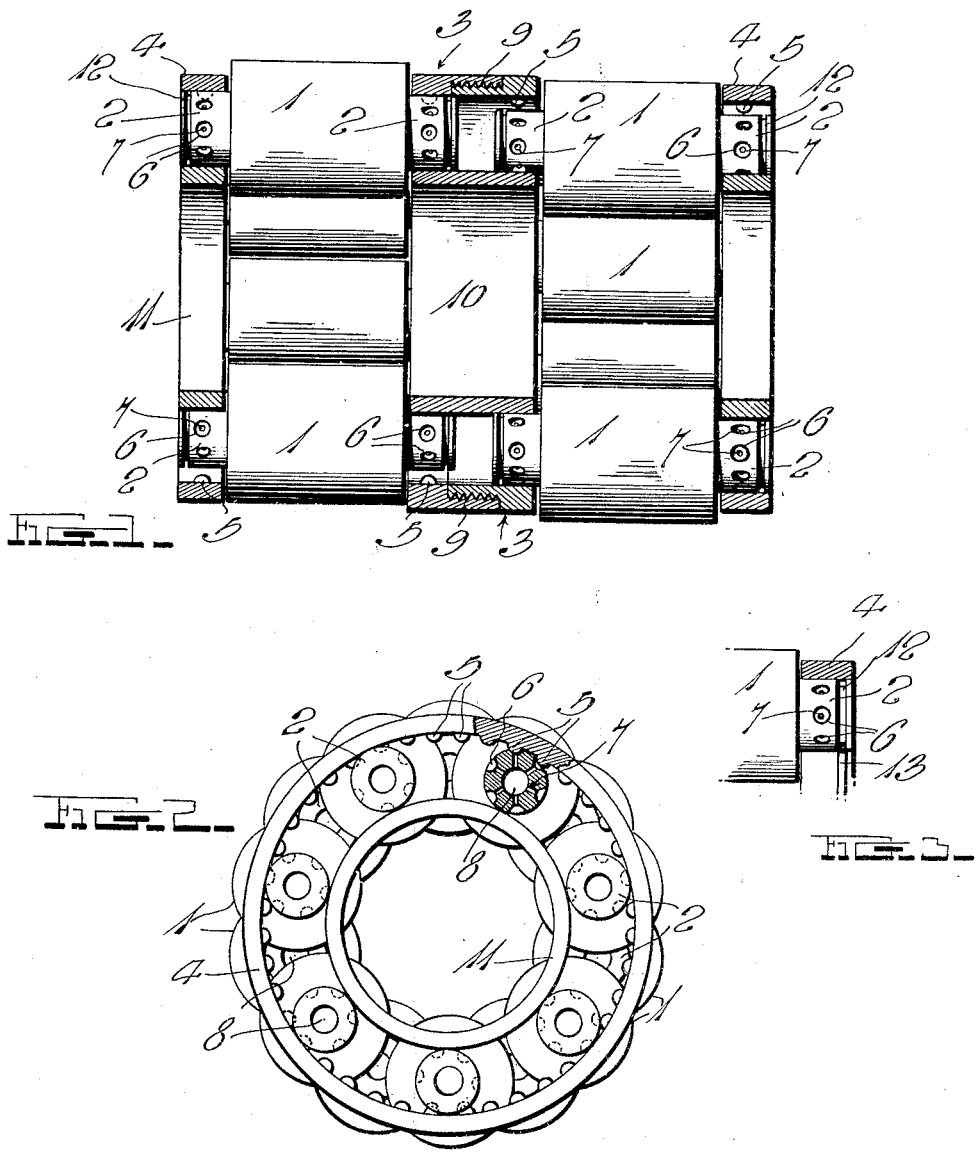

WILLIAM D. BURNS, OF AMENIA, NEW YORK.

ROLLER BEARING.

1,423,304.  Specification of Letters Patent.  Patented July 18, 1922.

Application filed April 25, 1921. Serial No. 464,093.

*To all whom it may concern:*

Be it known that I, WILLIAM D. BURNS, a citizen of the United States, residing at Amenia, in the county of Dutchess and State of New York, have invented certain new and useful Improvements in Roller Bearings; and I do declare the following to be a full, clear, and exact description of the invention, such as will enable others skilled in the art to which it appertains to make and use the same.

My invention relates to improvements in roller bearings and has for its principal object to provide a novel association of parts for holding the rollers of two annular series, in staggered relation with each other, whereby to prevent the part which rotates within the rollers, from having a noticeable tendency to spread the rollers of either series, as now often occurs.

Another object of my invention is to provide a novel spring ring for holding the ends of the rollers in proper engagement with the track rings upon which they roll.

With the foregoing and minor objects in view, the invention resides in the novel construction and association of parts hereinafter described anl claimed, the descriptive matter being supplemented by the accompanying drawings.

Figure 1 is a longitudinal sectional view, partly in elevation, showing a roller bearing constructed in accordance with my invention.

Figure 2 is an end elevation partly in section.

Figure 3 is a detail sectional view, partly in elevation, showing a slightly different form of construction which may be followed.

In the drawings above briefly described, I have shown two annular series of roller bearings 1, said series being disposed in axial alinement, with the rollers of one series staggered with respect to those of the other. The ends of all of the rollers are reduced to form trunnions 2. The trunnions at the inner ends of the rollers 1 travel on a relatively wide track ring 3 while the outermost trunnions engage narrower track rings 4, said track rings and trunnions being provided with inter-meshing gear faces so as to properly hold the rollers in position. As here shown, the gear faces comprise rounded, circumferentially spaced projections 5 on the inner faces of the track rings 3 and 4, and substantially hemispherical sockets 6 in the trunnions 2, spaced apart the proper distance to receive the projections 5. As the projections enter the sockets, any oil or foreign matter which would otherwise be trapped in said sockets, is forced therefrom through radial passages 7 which lead from the sockets to cavities 8 in the trunnions 2.

In order to facilitate assembling of the device, the central ring 3 is formed of two sections threaded together as indicated at 9. Spaced inwardly from this ring 3, is a relatively wide retaining ring 10 which engages the innermost of the trunnions 2 and holds them in proper engagement with said ring 3, while similar rings 11 engage the outermost trunnions. The trunnions 2 may if desired be provided near their outer ends with peripheral grooves 12 and spring metal retaining rings 13 may then take the place of the rings 10 and 11 as seen in Fig. 3, said spring metal rings being received in said grooves. These rings are provided to hold the rollers in proper engagement with the track rings before the axle or other part to rotate within the bearing, is inserted through the latter.

From the foregoing, taken in connection with the accompanying drawing, it will be seen that I have provided a comparatively simple and inexpensive, yet a highly efficient and desirable roller bearing in which the rollers of the two series will be held in staggered relation by the coacting gear faces on the trunnions 2 and the track rings 3 and 4. By maintaining this relation, the rollers of one series prevent the axle or the like from crowding between the rollers of the other series and thereby separating the last named rollers to an undesirable extent.

Since excellent results may be obtained from the details disclosed, they may be followed if desired. It is to be understood, however, that within the scope of the invention as claimed, numerous minor changes may be made.

I claim:—

1. A roller bearing comprising two series of rollers, the rollers of one series being staggered with respect to those of the other, the ends of all rollers being reduced, a relatively wide track ring on which the inner reduced ends of the rollers are adapted to roll, and relatively narrow track rings upon which the outer reduced ends of said rollers travel, said roller ends and track rings having intermeshing gear faces.

2. A structure as specified in claim 1; together with retaining rings to hold said reduced roller ends in engagement with said track rings, said relatively wide track ring being formed of two sections threaded together.

In testimony whereof I have hereunto set my hand.

WILLIAM D. BURNS.